Patented Nov. 14, 1922.

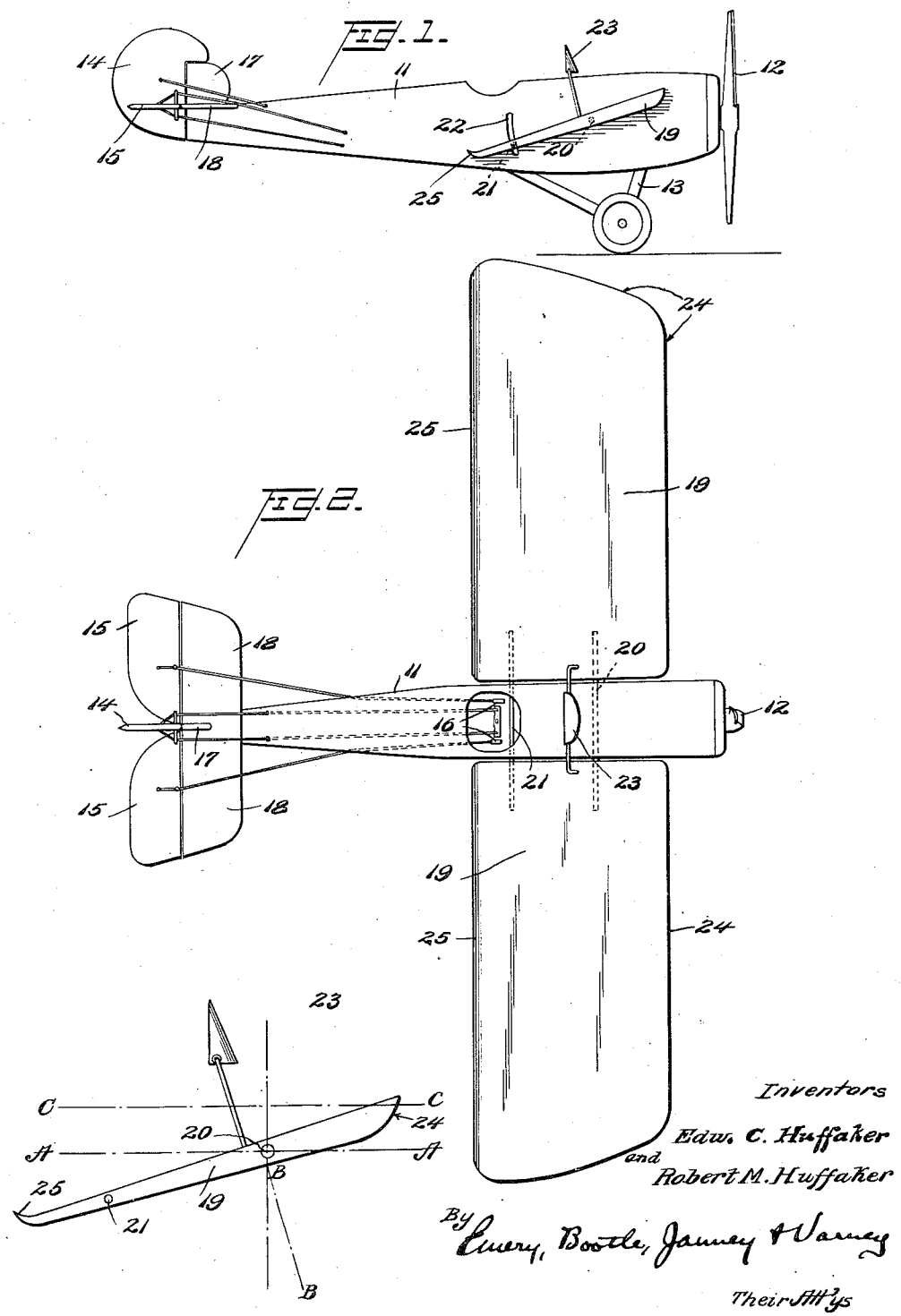

1,435,848

UNITED STATES PATENT OFFICE.

EDWARD CHALMERS HUFFAKER AND ROBERT MORELAND HUFFAKER, OF CHUCKEY, TENNESSEE.

AEROPLANE.

Application filed November 23, 1920. Serial No. 426,086.

*To all whom it may concern:*

Be it known that EDWARD CHALMERS HUFFAKER and ROBERT MORELAND HUFFAKER, of Chuckey, Greene County, Tennessee, have invented an Improvement in Aeroplanes, of which the following description, in connection with the accompanying drawings, is a specification, like characters on the drawings representing like parts.

The invention aims to provide for automatic longitudinal and lateral stability for aeroplanes with one or more supporting surfaces or sets of supporting surfaces, such as monoplanes, biplanes, triplanes and tandem planes. It is applicable to gliders, toy aeroplanes and both free and distance controlled flying torpedoes and aeroplanes carrying no operator as well as to aircraft operated and controlled by a pilot on board.

One part of the invention comprises shaping and arranging the lifting surfaces and head resistance of the wings and attached parts, or some of them, with reference to the center of gravity of the craft and the propeller thrust so as to tend to maintain an even keel and straight line flight under the constantly changing air conditions normally prevalent in the atmosphere.

Another part of the invention comprises attaching the lifting surfaces to the fuselage or body of the craft so as to permit of controlling their automatic action for quick maneuvering or to suit exceptional conditions of flight, such as approaching an obstacle or making a landing.

Further objects and other parts and characteristics of the invention appear hereafter. The principles and mode of operation of the invention may be understood from their application to the embodiment of the invention shown and described; but the invention is not restricted to this embodiment.

In the drawings, Fig. 1 is a side elevation of an aeroplane of the monoplane type embodying the invention;

Fig. 2 is a plan view of the same; and

Fig. 3 is a diagram or outline of the cross-sectional shape of a wing showing the relative positions of the center of gravity of the wing and of the fuselage and the direction and points of application of the principal forces acting on the wing and fuselage.

Referring to Figs. 1 and 2, the aeroplane therein shown has a fuselage 11 provided with a motor (not shown) and propeller 12 and running gear 13 of suitable design. The tail is fitted with a vertical rudder 14 and independent elevators 15 actuated from the cock pit by suitable controls 16. Vertical and horizontal stabilizers 17 and 18 may also be fitted if desired.

The wings 19 are mounted on a transverse supporting bar or frame 20 which passes through and is rotatably secured in the fuselage at a point approximately coincident with or slightly below its center of gravity. The pivotal axis of this wing supporting frame also preferably intersects the line of thrust of the propeller (see A—A in Fig. 3) and approximately coincides with the center of gravity of the wing structure which in the embodiment of the invention illustrated may be assumed to be located at a point about one third of its width back from the leading edge. The inner ends of the wings are shown connected near their trailing edges by a horizontal bar 21 which passes through suitably shaped clearance openings 22 in the sides of the fuselage and holds the wings parallel to each other and permits a limited rocking movement of both wings with respect to the fuselage. The bar 21 furnishes a convenient means by which the angle of incidence of the wings may be varied by the pilot.

In the aeroplane shown in the drawings, the wind shield 23 is mounted on a yoke carried by and connecting the wings and straddling the fore part of the fuselage in front of the cock pit so as to rock with the wings. It is entirely free from the fuselage but may be adjusted to a greater or less angle of inclination to the longitudinal axis of the fuselage to increase or decrease its head resistance to suit the conditions of flight.

The shape of the wings may be varied to suit the type of aircraft. In the form illustrated, the front and outer edge portion 24 of the lifting surface of each wing is turned up to bring the leading edge into the plane of the top surface across the entire spread and end of the wing; and the top surface is flat except for the trailing edge 25 which is turnd up on both the top and bottom surfaces, as shown in Fig. 3. The major portion of the bottom or lifting surface is a plane, the top and bottom planes being separated at the leading edge and converging toward the trailing edge. The point of application and the direction of the resultant pressure on the under surface of the wing varies with the angle of incidence, and the center of pressure on the lifting surface of the wing under normal flying conditions is preferably approximately in vertical alinement with the pivot axis 20, as shown by the line B—B in Fig. 3. The resultant of the head resistance of the up-turned leading edges of the wings and wind shield 23 constituting the pivotally mounted wing structure is designed to be above the pivot axis 20, as shown by the line C—C in Fig. 3.

The wings tend to adjust themselves automatically to maintain the aeroplane on an even keel for all speeds and conditions of flight by rocking slightly to vary the angle of incidence. If the speed is increased the aeroplane will ascend, and if it is decreased the aeroplane will descend without changing the position of the elevators. The position of the elevators and the angle of incidence of the planes may be changed or controlled by the pilot if desired in order to suit abnormal or temporary flying conditions, such as in hopping off, landing or maneuvering in the air.

The automatic action of the wings to maintain stability in flight may be explained by their shape and the relative position of their center of gravity with reference to their pivotal axis. By reference to Fig. 3 it is seen that under the conditions assumed the resultant B—B of the lifting force on the bottom surface passes slightly to the rear of the pivot axis of the wing, thereby tending to depress the leading edge of the wing. On the other hand, the resultant C—C of the head resistances of the leading edge and wind shield passes above the pivot axis and tends to raise the leading edge of the wing. These two forces tend to balance each other under normal flying conditions, because, if for any reason the pressure of the air on the under surface of either wing should fall off through a change in the atmospheric conditions, as by striking a descending air current, the head resistance would then over balance the resultant lifting force and would rock the wing to raise the leading edge and increase the angle of incidence, thereby increasing the lifting force and its moment about the pivot axis and restoring equilibrium.

In the aeroplane shown in the drawing, a rocking movement of one wing would be transmitted to the other wing with but slight diminution due to the lack of absolute rigidity of the structure, thereby tending to equalize the air resistance on the two wings and maintain both longitudinal and lateral stability.

Lateral stability is further automatically maintained by the inertia of the fuselage and centrifugal force acting on the fuselage, both of which are applied to the wing structure approximately along the line of the pivot axis and, as the center of gravity of the fuselage is above the lifting surface, these forces tend to counteract the tendency to bank and turn caused by the dropping of one wing or lifting of the other wing due to encountering irregular air currents or pockets. The higher the speed the greater the effect of centrifugal force in maintaining lateral stability and in holding the aeroplane on a straight course.

The effect of the invention in counteracting side slip may be explained as follows: Side slip causes an increase in the head resistance on the leading edge of the slipping wing tending both to increase the angle of incidence and to turn the plane and thereby bring into play the effect of inertia and centrifugal force acting on the fuselage to elevate the slipping wing. Also the center of pressure on the under side of the wing will be shifted slightly toward the slipping side thereby increasing the force tending to elevate the slipping wing.

Our invention is not restricted to the particular shapes and arrangements of parts, nor to the details of construction shown and described, it being understood that the word wing and the word aeroplane as used herein are intended to apply to all forms of aircraft having surfaces for maintaining them in flight by the pressure of the air against them.

We claim the following as our invention:

1. A supporting wing for an aeroplane having a flat lifting surface with its leading edge curved upwards, the center of gravity of the wing structure being above the center of pressure on the lifting surface, and means for attaching said wing to the body of the aeroplane in transverse alinement with the center of gravity of the wing structure.

2. A supporting wing for an aeroplane having a flat lifting surface with its leading edge curved upwards, the center of gravity of the wing structure being above the center of pressure on the lifting surface, and means for pivotally attaching said wing to the body of the aeroplane in transverse alinement with the center of gravity of the wing structure, whereby said wing is free to rock with respect to said body.

3. A supporting wing for an aeroplane having its leading edge curved upwards, the center of gravity of the wing structure being below the line of application of the head resistance of the wing structure, and means for attaching said wing to the body of the aeroplane in transverse alinement with the center of gravity of the wing structure.

4. A supporting wing for an aeroplane having its leading edge curved upwards, the center of gravity of the wing structure being below the line of application of the head resistance of the wing structure, and means for pivotally attaching said wing to the body of the aeroplane in transverse alinement with the center of gravity of the wing structure.

5. An aeroplane having a body provided with propelling means and supporting wings pivotally secured thereto upon a transverse axis in horizontal alinement with the direction of thrust of said propelling means, the center of gravity of said body being approximately over said transverse axis.

6. An aeroplane having a body and lateral supporting wings pivotally secured thereto upon a transverse axis, the center of gravity of said body being on or over said transverse axis, and means for causing said lateral wings to move substantially in synchronism, comprising a connection between said wings subject to manual control.

7. An aeroplane having a body provided with propelling means and a tail having vertical and horizontal rudders, and laterally extending wing structure having substantially plane lifting surfaces disposed below the center of gravity of said wing structure, said body and wings being shaped to offer head resistance having its resultant line of application above the center of gravity of said body and wing structure.

8. An aeroplane having a body provided with propelling means, and a tail having vertical and horizontal rudders, and laterally extending wing structure having substantially plane lifting surfaces pivotally secured to said body upon a transverse axis approximately intersecting the line of thrust of said propelling means, said wing structure being shaped to offer head resistance having its resultant line of application above said transverse axis.

9. An aeroplane having supporting surfaces arranged below its center of gravity, and means associated with said supporting surfaces projecting above said center of gravity and exposed to the action of the air whereby the head resistance on said means and supporting surfaces is effective on said aeroplane as though centered above said center of gravity.

10. An aeroplane having supporting surfaces arranged below and to the rear of its center of gravity, and means associated with said supporting surfaces projecting above said center of gravity whereby the head resistance on said supporting surfaces and means is above and in front of said center of gravity.

11. An aeroplane having supporting surfaces arranged below its center of gravity, and controllable means associated with said supporting surfaces projecting above said center of gravity whereby the head resistance on said supporting surfaces and means may be caused to act above said center of gravity to balance the lifting pressure on said supporting surfaces.

12. An aeroplane having supporting wings, presenting surfaces for the action of dynamic forces due to motion through the air, the head resistance upon said surfaces being centered above the center of pressure on said supporting surfaces, and a power operated means for propelling said aeroplane having its direction of thrust passing above the center of pressure on said supporting surfaces, whereby said dynamic forces operating on the wing supporting surfaces and non-supporting surfaces, respectively, promote stability.

13. An aeroplane having a body and lateral supporting wings with flat lower faces and upturned front and rear edges pivotally secured thereto upon a transverse axis, and automatic means for causing said lateral wings to move substantially in synchronism.

In testimony whereof, we have signed our names to this specification.

EDWARD CHALMERS HUFFAKER.
ROBERT MORELAND HUFFAKER.